*(12)* United States Patent
Chacon et al.

(10) Patent No.: US 10,012,213 B2
(45) Date of Patent: Jul. 3, 2018

(54) SYSTEM AND METHOD FOR UPGRADING MULTIVENDOR WIND TURBINES

(71) Applicant: General Electric Company, Schenectady, NY (US)

(72) Inventors: Joseph Lawrence Chacon, Greenville, SC (US); William Earl Fish, Amsterdam, NY (US); Noah Pennington, Simpsonville, SC (US); Mark Edward Cardinal, Altamont, NY (US)

(73) Assignee: General Electric Company, Schenectady, NY (US)

( * ) Notice: Subject to any disclaimer, the term of this patent is extended or adjusted under 35 U.S.C. 154(b) by 202 days.

(21) Appl. No.: 15/015,451

(22) Filed: Feb. 4, 2016

(65) Prior Publication Data

US 2017/0226987 A1   Aug. 10, 2017

(51) Int. Cl.
*G05D 3/12* (2006.01)
*F03D 7/02* (2006.01)
(Continued)

(52) U.S. Cl.
CPC ........... *F03D 7/0244* (2013.01); *F03D 7/042* (2013.01); *F03D 17/00* (2016.05);
(Continued)

(58) Field of Classification Search
CPC ........ F03D 7/0244; F03D 7/042; F03D 17/00; G05B 13/0291; G05B 19/0428
See application file for complete search history.

(56) References Cited

U.S. PATENT DOCUMENTS

| 5,020,135 A | 5/1991 | Kasparian et al. |
| 5,505,284 A | 4/1996 | Halderman |

(Continued)

FOREIGN PATENT DOCUMENTS

| EP | 2 256 339 A2 | 12/2010 |
| EP | 2 610 485 A2 | 7/2013 |

(Continued)

OTHER PUBLICATIONS

Extended European Search Report and Opinion issued in connection with corresponding EP Application No. 17154454.7 dated Jun. 29, 2017.

*Primary Examiner* — Vincent Tran
(74) *Attorney, Agent, or Firm* — Dority & Manning, P.A.

(57) ABSTRACT

The present disclosure is directed to a system and method for controlling and/or upgrading aftermarket multivendor wind turbines. The system includes a turbine controller configured to control operations of the wind turbine, a safety device configured to provide a signal indicative of a health status of the safety device, and a secondary controller inserted between the safety device and the turbine controller. The secondary controller is configured to receive the signal from the safety device over a communication interface. As such, if the signal indicates a normal health status, the secondary controller is configured to send the signal to the turbine controller, i.e. maintain normal operation. Alternatively, if the signal indicates a poor health status, the secondary controller is configured to adjust the signal based at least in part on a signal bias to an adjusted signal and to provide the adjusted signal to the turbine controller.

15 Claims, 6 Drawing Sheets

(51) Int. Cl.
  *F03D 7/04*      (2006.01)
  *F03D 17/00*     (2016.01)
  *G05B 23/02*     (2006.01)
  *G05B 19/042*    (2006.01)

(52) U.S. Cl.
  CPC ..... *G05B 19/0428* (2013.01); *G05B 23/0267* (2013.01); *G05B 23/0291* (2013.01); *F05B 2230/60* (2013.01); *F05B 2270/303* (2013.01); *F05B 2270/321* (2013.01); *F05B 2270/334* (2013.01); *F05B 2270/504* (2013.01); *F05B 2270/80* (2013.01); *G05B 2219/14116* (2013.01); *G05B 2219/2619* (2013.01)

(56) References Cited

U.S. PATENT DOCUMENTS

| | | | |
|---|---|---|---|
| 6,883,317 | B2 | 4/2005 | Heath |
| 7,236,877 | B2 | 6/2007 | Dudel et al. |
| 7,770,704 | B1 | 8/2010 | Dumas |
| 8,057,175 | B2* | 11/2011 | Vadari ............... F03D 7/0224 416/35 |
| 8,364,961 | B2 | 1/2013 | Tanaka et al. |
| 8,914,184 | B2 | 12/2014 | McQuade et al. |
| 2009/0187282 | A1 | 7/2009 | Menke et al. |
| 2012/0070285 | A1* | 3/2012 | Cousineau ............ F03D 7/0224 416/31 |
| 2013/0169418 | A1 | 7/2013 | Seo et al. |
| 2014/0343740 | A1* | 11/2014 | Eriksen .................. F03D 7/047 700/287 |
| 2015/0065052 | A1 | 3/2015 | Heo et al. |
| 2015/0188755 | A1* | 7/2015 | Glosser, Jr. ......... G06F 11/1625 370/228 |
| 2015/0337806 | A1* | 11/2015 | Damgaard .............. F03D 7/047 700/287 |
| 2016/0265510 | A1* | 9/2016 | Chacon ................ F03D 7/0224 |
| 2016/0265512 | A1 | 9/2016 | Chacon et al. |
| 2016/0281682 | A1* | 9/2016 | Lee ........................ F03D 7/043 |
| 2017/0030332 | A1* | 2/2017 | Chacon .................. F03D 7/047 |
| 2017/0248124 | A1* | 8/2017 | Hammerum ............ F03D 7/045 |

FOREIGN PATENT DOCUMENTS

| | | |
|---|---|---|
| JP | 2009-076006 A | 4/2009 |
| JP | 2010-137643 A | 6/2010 |
| KR | 100581448 B1 | 5/2006 |
| KR | 20130079458 A | 7/2013 |
| WO | 2010/024945 A1 | 3/2010 |
| WO | 2012/012179 A1 | 1/2012 |

\* cited by examiner

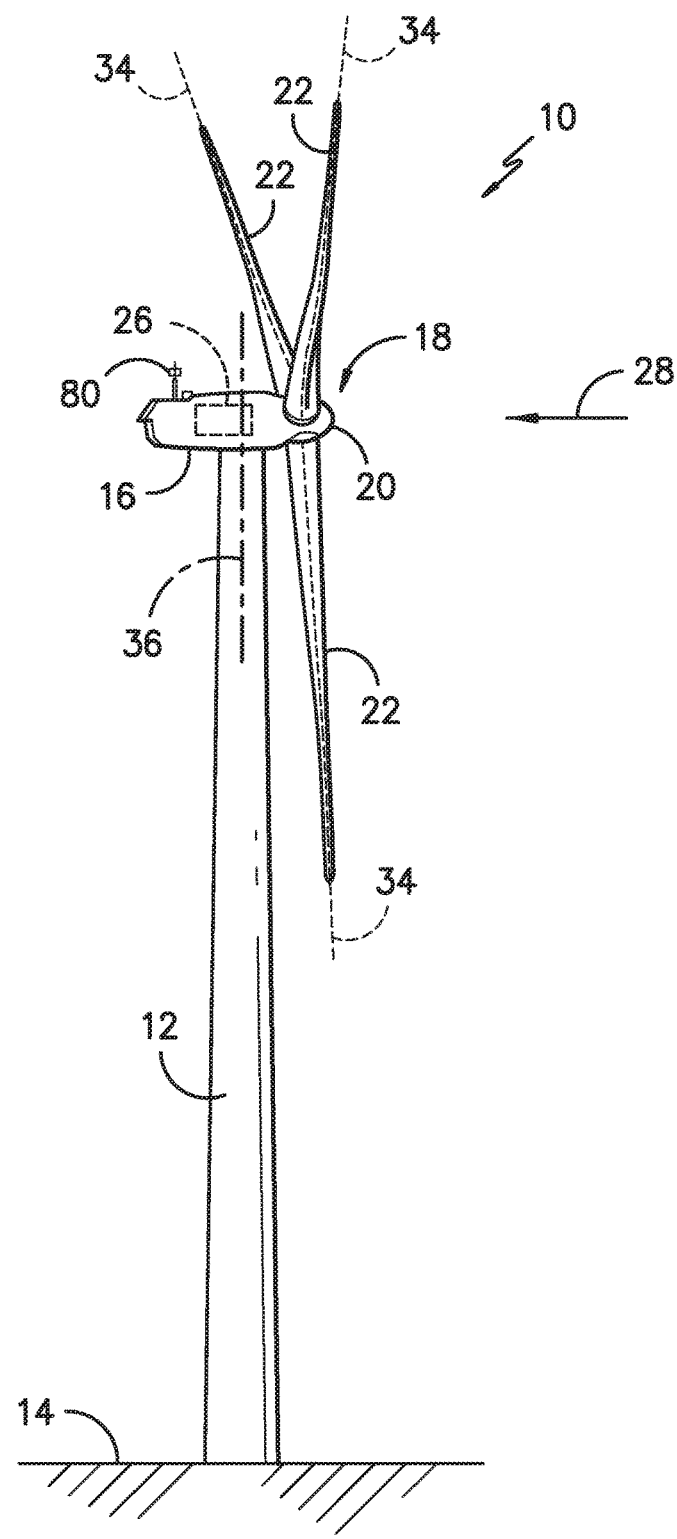
FIG. -1-

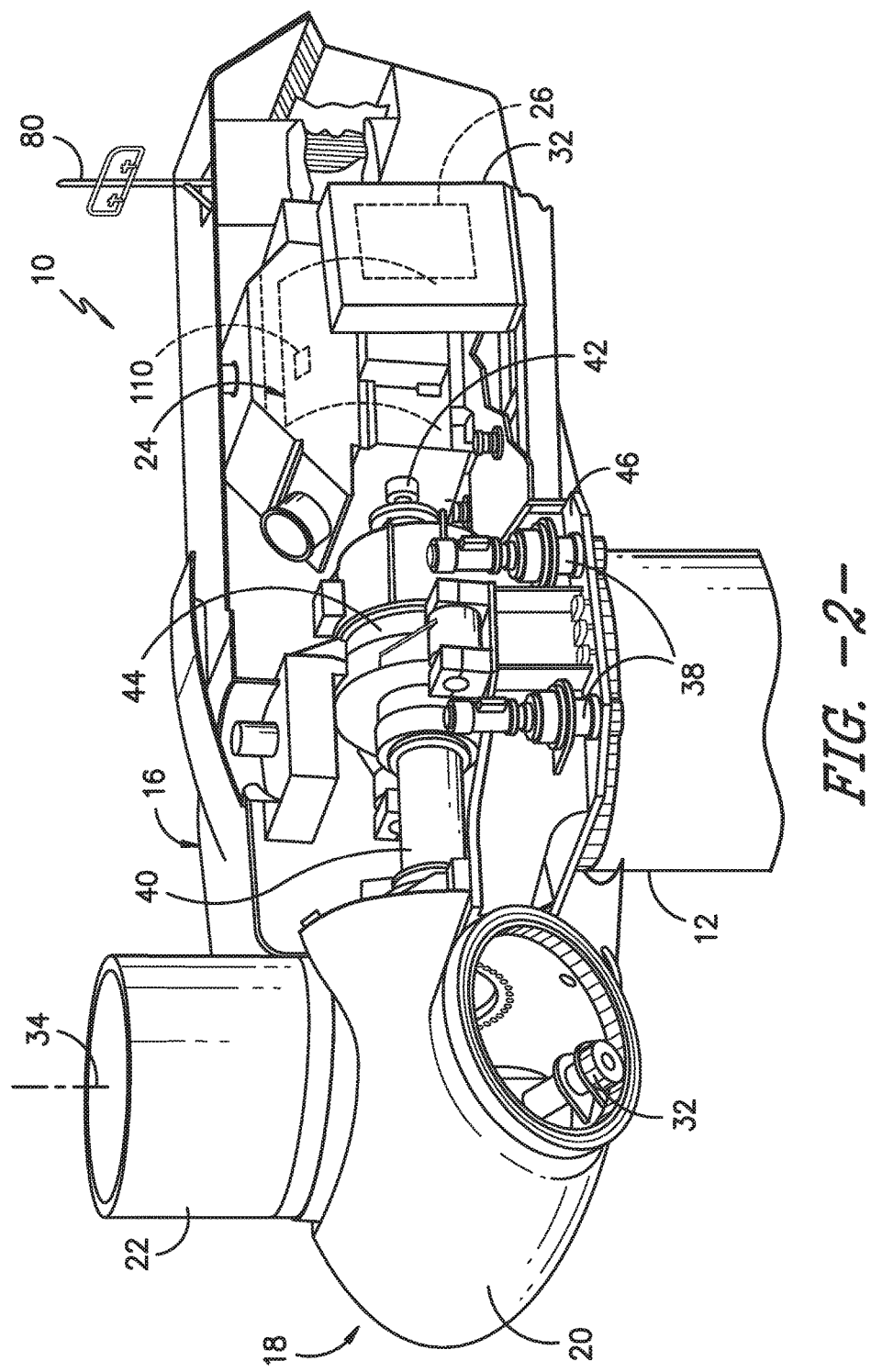
FIG. -2-

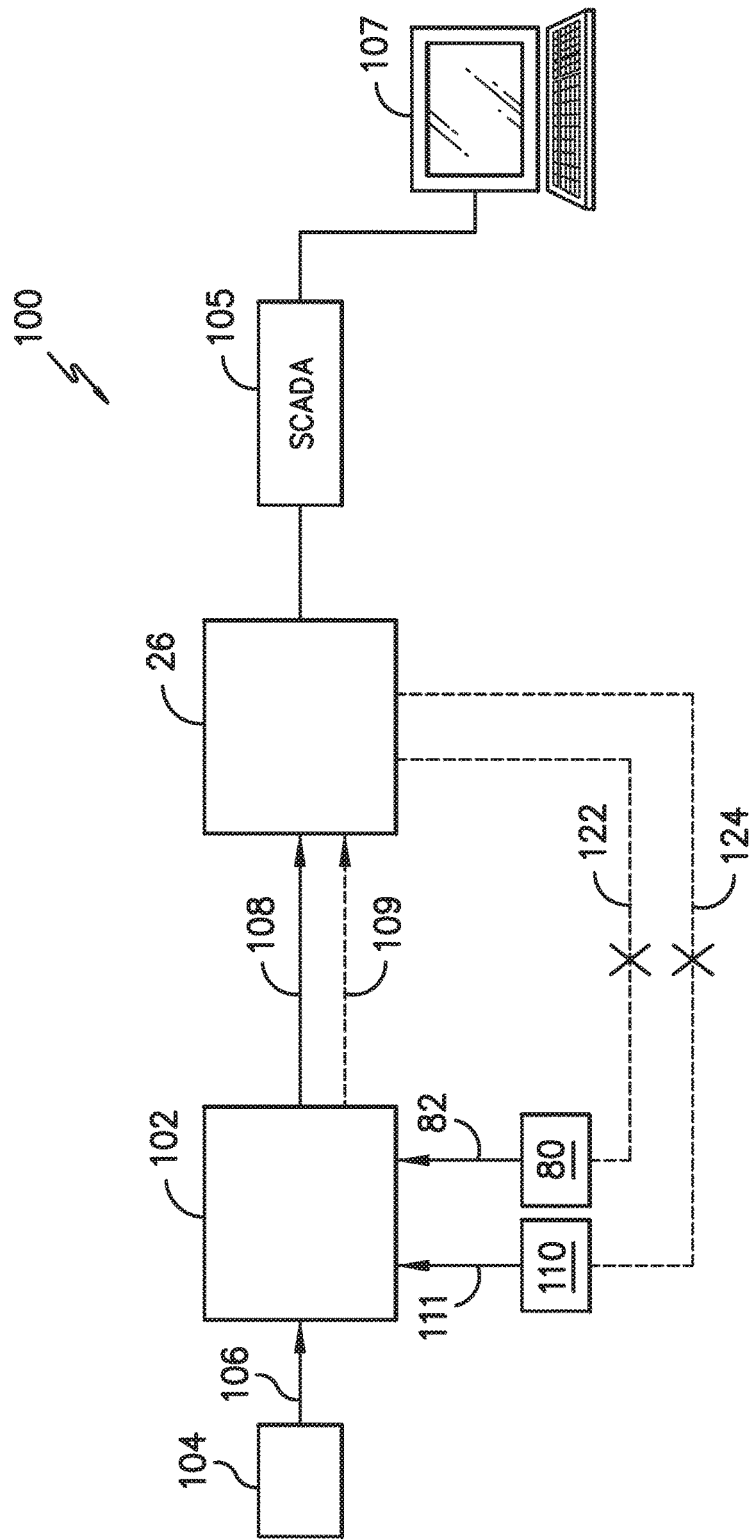
FIG. -3-

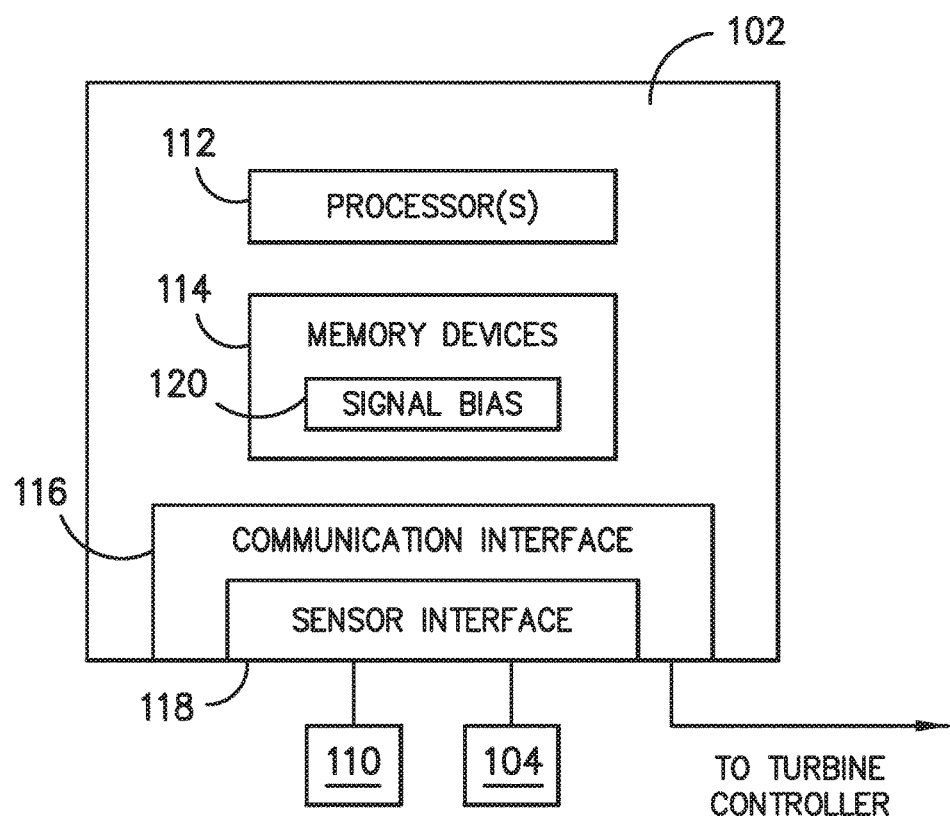
FIG. -4-

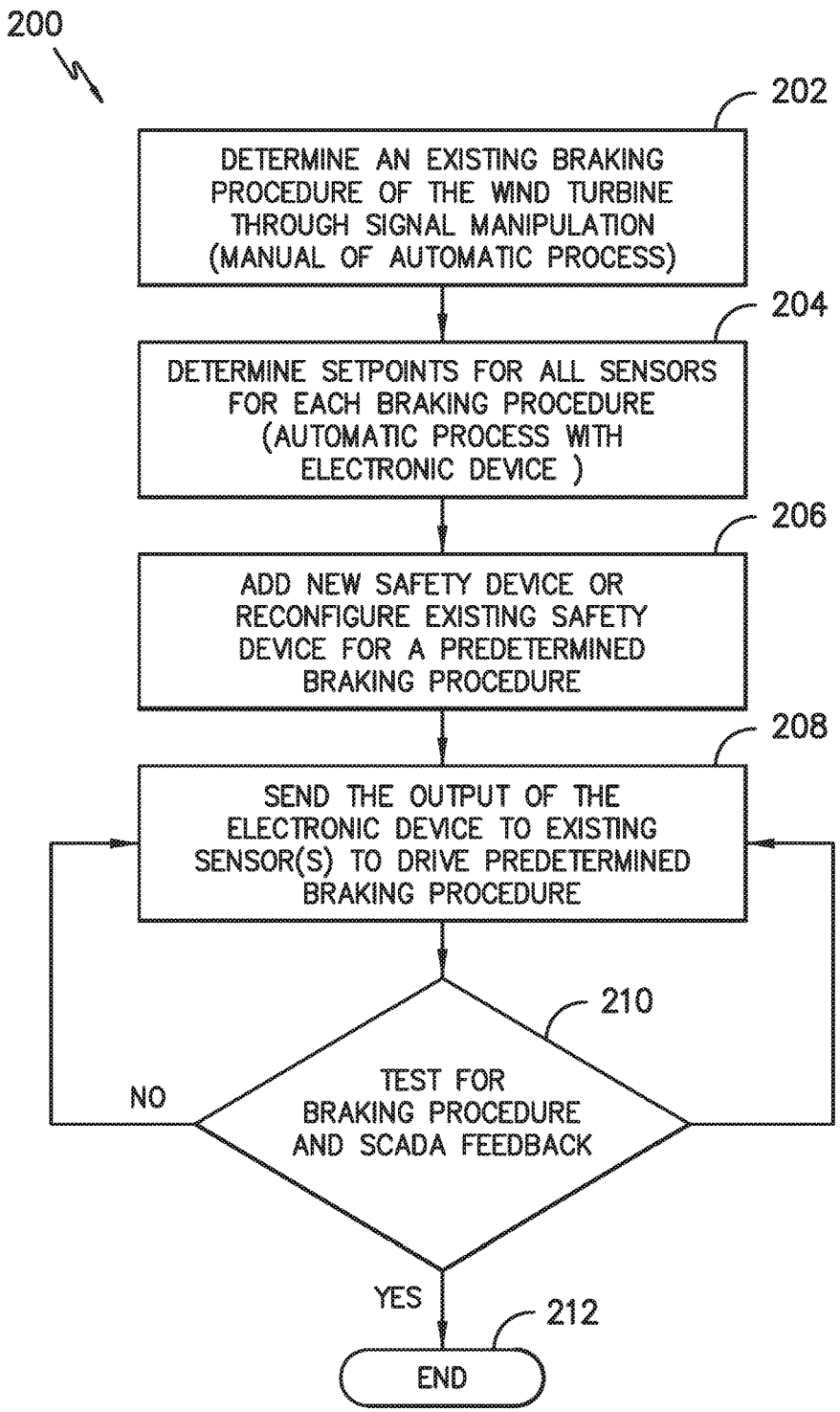
FIG. -5-

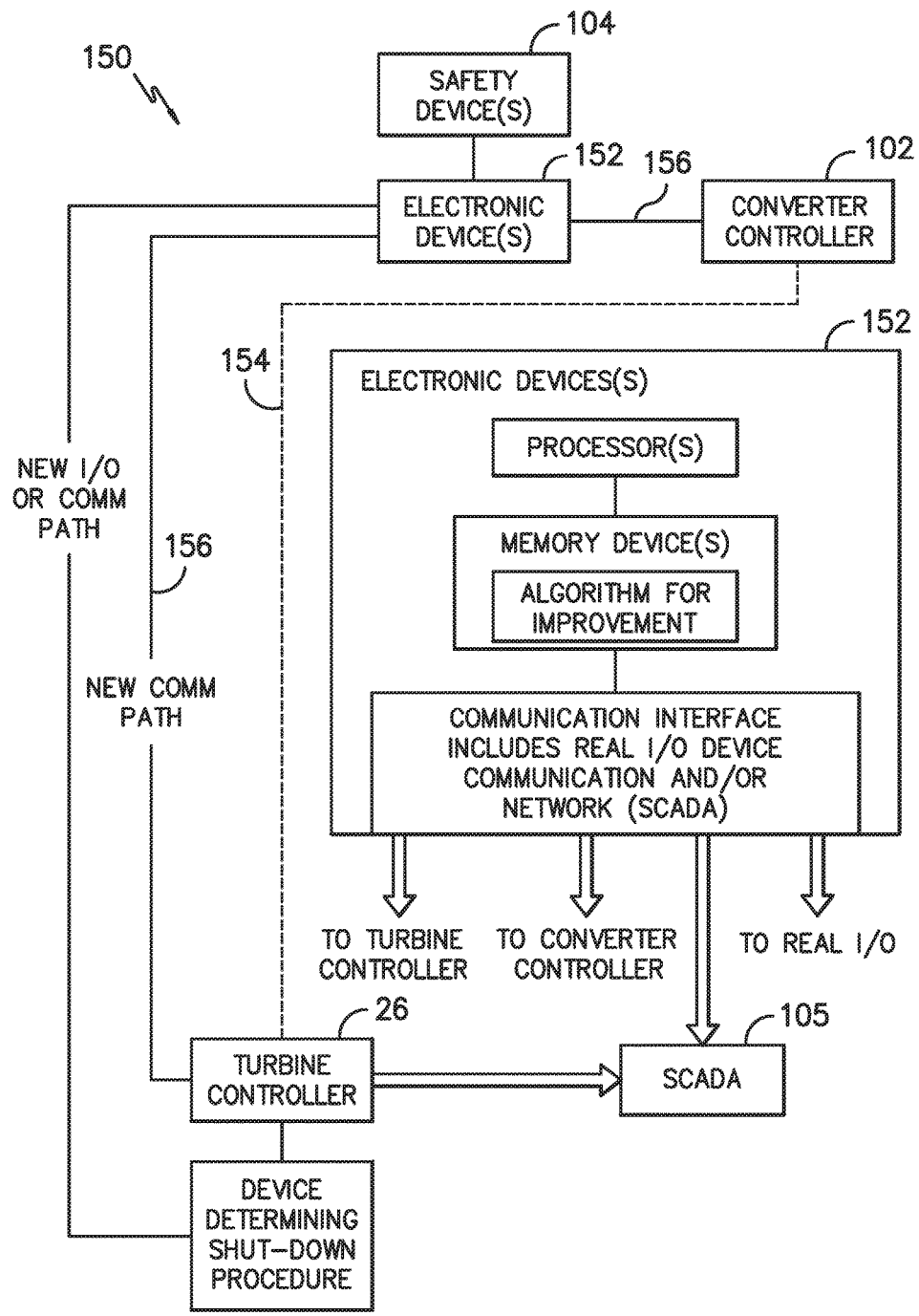
FIG. -6-

SYSTEM AND METHOD FOR UPGRADING MULTIVENDOR WIND TURBINES

FIELD OF THE INVENTION

The present disclosure relates in general to wind turbines, and more particularly to systems and methods for upgrading multi-vendor wind turbines with safe or soft shut down capabilities when aftermarket hardware (e.g. safety devices) is installed.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The various components of the wind turbine are typically controlled via a wind turbine controller. Thus, the turbine controller is generally programmed with source code that operates the various components of the wind turbine. The source code of a particular wind turbine is typically proprietary and therefore locked by its respective vendor or manufacturer. As such, the source code generally cannot be manipulated or changed by another vendor that may subsequently end up operating the turbine. Accordingly, for multi-vendor turbines, parameter optimization is not possible. In addition, even some hardware of multi-vendor turbines can be locked such that it cannot be manipulated.

Oftentimes, it is advantageous to add new hardware to a wind turbine to improve annual energy production (AEP) of the turbine. Though some turbines may have spare discreet I/O preprogrammed for aftermarket devices, many turbines do not have spare I/Os. In such instances, it is impossible for aftermarket hardware to communicate with the turbine controller. For example, the Federal Aviation Authority has recently began requiring many turbines to employ an aftermarket aviation light. In turbines without spare I/Os, failure of the aviation light is undetectable.

In view of the aforementioned issues, the present disclosure is directed to a system and method for upgrading aftermarket multi-vendor wind turbines with safe or soft shut down capabilities in the event of add-on hardware failure.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a system for controlling and/or upgrading an aftermarket multivendor wind turbine. The system includes a turbine controller configured to control operations of the wind turbine, a safety device configured to provide a signal indicative of a health status of the safety device, and a secondary controller inserted between the safety device and the turbine controller. The secondary controller is configured to receive the initial signal from the safety device over a communication interface. As such, if the signal indicates a normal health status of the safety device, the secondary controller is configured to send the initial signal to the turbine controller, i.e. to maintain normal operation. Alternatively, if the initial signal indicates a poor health status of the safety device, the secondary controller is configured to adjust the initial signal based at least in part on a signal bias to an adjusted signal and to provide the adjusted signal to the turbine controller.

In one embodiment, the secondary controller is configured to adjust the signal without accessing computer-readable instructions implemented by the turbine controller.

In another embodiment, the safety device may include an aftermarket safety device. Alternatively, the safety device may include an existing safety device of the wind turbine. Further, in certain embodiments, the safety device may include an aviation light, a vibration sensor, a loading sensor, an icing sensor, a temperature sensor, a wind condition sensor, a fire safety device, a bird or bat detector, shadow flicker sensors, or any other safety device.

In further embodiments, the adjusted signal may include an updated braking procedure for the wind turbine. More specifically, in certain embodiments, the secondary controller may be configured to determine an existing braking procedure of the wind turbine, which typically includes a hard brake procedure, a medium brake procedure, and a soft brake procedure. Thus, the secondary controller is further to determine set points for existing wind turbines sensors for each of the hard brake procedure, the medium brake procedure, and the soft brake procedure.

In additional embodiments, the existing braking procedure may be determined automatically via the secondary controller using an auto-tuning process. More specifically, in certain embodiments, the auto-tuning process may include incrementally adjusting the signal bias among a plurality of incremental signal bias values for each of a plurality of input conditions, monitoring a braking procedure of the wind turbine at each of the plurality of incremental signal bias values, and selecting the signal bias for the input conditions from the plurality of incremental signal bias values based at least in part on the braking procedure associated with each of the plurality of incremental signal bias values. Alternatively, the existing braking procedure of the wind turbine may be determined manually.

Thus, by knowing the existing braking procedure, the secondary controller may provide an adjusted signal that corresponds to the updated braking procedure for the wind turbine.

In still further embodiments, the secondary controller may include an interface configured to receive one or more input signals or conditions from a plurality of sensors. Thus, in such embodiments, the secondary controller may be configured to determine the signal bias based at least in part on the one or more input signals. In certain embodiments, the input signal(s) may include signal(s) indicative of a shaft speed, a power output, vibrations, temperature, or wind speed.

In another aspect, the present disclosure is directed to a method for controlling and/or upgrading an aftermarket multivendor wind turbine. The wind turbine includes a safety device in communication with a wind turbine controller over a signal path. Thus, the method includes inserting a secondary controller between the safety device and the wind turbine controller in the signal path. Another step includes generating, via the safety device, an initial signal indicative of a health status of the safety device. The method also includes receiving, via a communication interface, the signal at the secondary controller. Further, the method includes determining, at the secondary controller, an adjusted signal that is different from the initial signal based at least in part on a signal bias. The method also includes providing the adjusted signal to the wind turbine controller.

In one embodiment, the adjusted signal may include an updated braking procedure of the wind turbine. Further, in some embodiments, the method may further include determining, via the secondary controller, an existing braking procedure of the wind turbine. More specifically, the existing braking procedure typically includes a hard brake procedure, a medium brake procedure, and a soft brake procedure. Thus, the method may also include determining, via the secondary controller, set points for existing wind turbines sensors for each of the hard brake procedure, the medium brake procedure, and the soft brake procedure.

In certain embodiments, the method may include automatically determining the existing braking procedure via the secondary controller using an auto-tuning process. More specifically, the auto-tuning process may include incrementally adjusting the signal bias among a plurality of incremental signal bias values for each of a plurality of input conditions, monitoring a braking procedure of the wind turbine at each of the plurality of incremental signal bias values, and selecting the signal bias for the input conditions from the plurality of incremental signal bias values based at least in part on the braking procedure associated with each of the plurality of incremental signal bias values. Alternatively, the method may include manually determining, via the secondary controller, an existing braking procedure of the wind turbine.

In yet another aspect, the present disclosure is directed to a system for controlling a wind turbine. The system includes a turbine controller configured to control operations of the wind turbine, a secondary controller electronically coupled to the turbine controller, and at least one electronic device inserted between the turbine controller and the secondary controller. The turbine controller and the secondary controller are configured to communicate at least one command signal therebetween. Thus, the electronic device(s) is configured to intercept and adjust the command signal based at least in part on a signal bias to an adjusted command signal and to provide the adjusted signal to at least one of the turbine controller or the secondary controller.

In one embodiment, the secondary controller includes a converter controller of the wind turbine. In another embodiment, the command signal includes at least one of a torque command signal and/or any other frequency converter command signal. In yet another embodiment, the system may further include a safety device configured between the converter controller and the turbine controller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a simplified, internal view of one embodiment of a nacelle of a wind turbine;

FIG. 3 illustrates a schematic diagram of one embodiment of a system for controlling a wind turbine according to the present disclosure;

FIG. 4 illustrates a block diagram of suitable components that may be included in a controller of the system according to the present disclosure;

FIG. 5 illustrates a flow diagram of one embodiment of a method for controlling the wind turbine according to the present disclosure; and FIG. 6 illustrates a schematic diagram of another embodiment of a system for controlling a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system for controlling and/or upgrading aftermarket multivendor wind turbines. More specifically, the system includes a turbine controller configured to control operations of the wind turbine, a safety device configured to provide an initial signal indicative of a health status of the safety device, and a secondary controller inserted between the safety device and the turbine controller. Thus, the secondary controller is configured to receive the initial signal from the safety device. If the initial signal indicates a normal health status of the safety device, the secondary controller is configured to send the unadjusted initial signal to the turbine controller, i.e. to maintain normal operation. Alternatively, if the initial signal indicates a poor health status of the safety device, the secondary controller is configured to adjust the initial signal based at least in part on a signal bias to an adjusted signal and to provide the adjusted signal to the turbine controller. For example, in certain embodiments, the adjusted signal may include a predetermined braking procedure for the wind turbine.

As such, the present disclosure provides many advantages not present in the prior art. For example, the secondary controller 102 is not required to communicate with the turbine controller 26. Further, the safety chain does not have to be interfaced with the secondary controller to create a hard braking fault. Rather, a soft braking procedure can be implemented, which can indicate to a technician to troubleshoot the problem. In addition, the present disclosure is scalable and configurable for multiple turbines.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

The wind turbine 10 may also include a turbine control system including turbine controller 26 within the nacelle 16 or somewhere else associated with the wind turbine 10. In general, the turbine controller 26 may include one or more processing devices. Thus, in several embodiments, the turbine controller 26 may include suitable computer-readable instructions that, when executed by one or more processing devices, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10.

For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32.

Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 36.

Still further, the turbine controller 26 may be configured to control the torque of a generator 24 (FIG. 2). For example, the turbine controller 26 may be configured to transmit control signals/commands to the generator 24 directly or indirectly through a frequency converter in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

Referring now to FIG. 3, a system 100 for controlling a wind turbine, such as wind turbine 10 of FIG. 1, according to example embodiments of the disclosure is illustrated. As shown, the control system 100 includes the wind turbine controller 26 that is configured to control operations of the wind turbine 10. The turbine controller 26 can include computer-readable instructions that when executed by one or more processors cause the one or more process to implement various control routines. Further, the turbine controller 26 may include or may be in communication with the SCADA 105 (supervisory control and data acquisition), which is a system for remote monitoring and control that operates with coded signals over communication channels. In addition, as shown, the system 100 may further include any suitable user interface 107 for interacting with a user or operator of the system 100. In some embodiments, the computer-readable instructions associated with the turbine controller 26 can be inaccessible or otherwise unavailable. For instance, the turbine controller 26 may have been installed and/or configured by a different service provider.

The system 100 can further include various sensors 80, 110, e.g. configured to measure wind and/or operating conditions associated with the wind turbine 10. For instance, sensor 110 can be configured to measure a rotational speed of a rotor shaft of the wind turbine 10, a power output of the wind turbine 10, a loading condition of the wind turbine, or any other wind turbine parameter. Sensor 80 can be configured to measure various wind conditions at or near the wind turbine 10. Sensors 80, 110 can include any suitable sensors or components, such as one or more encoders, proximity sensors, transducers, resolvers, or the like. Two sensors 80, 110 are illustrated in the figures for purposes of illustration and discussion. Those of ordinary skill in the art, using the disclosures provided herein, will understand that more or fewer sensors can be used without deviating from the scope of the present disclosure.

The system 100 also includes a safety device 104 installed therein. For example, in certain embodiments, the safety device 104 may include an aftermarket safety device and/or an existing safety device of the wind turbine 10. Thus, as used herein, a safety device generally refers to any aftermarket or existing device or hardware that improves safety of the wind turbine 10 and/or protects the wind turbine 10 from damage. In addition, the safety device(s) described herein may be associated with operational or non-operational parameters. More specifically, the safety device 104 may include an aviation light, a vibration sensor, a loading sensor, an icing sensor, a temperature sensor, a wind condition sensor, a fire safety device, a bird or bat detector, shadow flicker sensors or any other safety device. During operation, the safety device 104 is configured to provide a signal indicative of a health status of the safety device 104, e.g. to a secondary controller 102 as described below.

To adjust the operation of the turbine controller 26, e.g. in response to the health status of the safety device 104, without requiring access to the computer-readable instructions associated with the turbine controller, a secondary controller 104 may be inserted between the safety device 104 and the turbine controller 26. Thus, the secondary controller 102 is configured to receive an initial signal from the safety device 104 via signal path 106 that is indicative of a health status of the safety device 104. If the initial signal indicates a normal health status of the safety device 104, the secondary controller 102 is configured to send the unadjusted initial signal to the turbine controller 26 via signal path 108 so as to maintain normal operation. Alternatively, if the initial signal indicates a poor health status, e.g. a burnt out aviation light, the secondary controller 102 is configured to adjust the initial signal based at least in part on a signal bias 120 to an adjusted signal that is different from the initial signal and to provide the adjusted signal to the turbine controller 26 via signal path 109.

As used herein, a signal path can include any suitable communication medium for transmitting the signals. For instance, a signal path can include any number of wired or wireless links, including communication via one or more Ethernet connections, fiber optic connections, network buses, power lines, conductors, or circuits for transmitting information wirelessly. Signals can be communicated over a signal path using any suitable communication protocol, such as a serial communication protocol, broadband over power line protocol, wireless communication protocol, or other suitable protocol.

The secondary controller 102 may be pre-programmed with suitable computer medium, e.g. one or more look-up tables and/or algorithms, that are configured to adjust the signals received from the sensors 110, 80 to an adjusted signal based on a signal bias 120 (FIG. 4). An adjusted signal can be determined, for instance, by adding or subtracting the signal bias 120 from a signal. In certain embodiments, the adjusted signal may include an updated braking procedure for the wind turbine 10 as described herein.

In particular embodiments, the secondary controller 102 is configured to adjust the signal without accessing computer-readable instructions implemented by the turbine controller 26. Thus, in such embodiments, the secondary controller 102 can be separated from the wind turbine controller 26 by a distance (e.g. 1 m, 1 cm or less, 2 m or more, or other suitable distance). In addition, the secondary controller 102 can be located in a separate housing and/or can include one or more components (e.g. processors, memory devices, etc.) that are different from the components of the wind turbine controller 26. In embodiments, the secondary controller 102 can use different computer-readable instructions stored in a different language or protocol relative to the turbine controller 26. In this way, the secondary controller 102 can be a standalone and separate device from the turbine controller 26.

In the event that the health status of the safety device 104 is deemed unhealthy or poor, the secondary controller 102 is further configured to transmit an adjusted signal to the turbine controller 26 corresponding to a predetermined braking procedure of the wind turbine 10. More specifically, the existing braking procedure may include a hard brake procedure, a medium brake procedure, and a soft brake procedure.

In certain embodiments, the existing braking procedure may be determined automatically via the secondary controller 102 using an auto-tuning process. For example, the auto-tuning process may include incrementally adjusting the signal bias 120 among a plurality of incremental signal bias values for each of a plurality of input conditions, monitoring a braking procedure of the wind turbine 10 at each of the plurality of incremental signal bias values, and selecting the signal bias for the input conditions from the plurality of incremental signal bias values based at least in part on the braking procedure associated with each of the plurality of incremental signal bias values. Alternatively, the existing braking procedure of the wind turbine 10 may be determined manually. Thus, the secondary controller 102 is further to determine set points for existing wind turbines sensors (e.g. sensors 110, 80) for each of the hard brake procedure, the medium brake procedure, and the soft brake procedure.

Still referring to FIG. 3, the secondary controller 102 can be configured to determine an adjusted signal based at least in part on signals associated with various input conditions (e.g. shaft speed, a power output, vibrations, temperature, wind speed, or similar) as determined from, for instance, the signals received from the sensors 110, 80. For instance, different signal bias values can be associated with different input conditions. For example, the secondary controller 102 can receive a signal from sensor 110 over signal path 111. The secondary controller 102 can also receive a signal from sensor 80 over signal path 82. The sensor 80 can be a sensor configured to provide signals indicative of wind speed, such as an anemometer or other suitable method or apparatus. The wind speed of the wind turbine 10 may be measured, such as through use of a suitable weather sensor 80. Suitable weather sensors include, for example, Light Detection and Ranging ("LIDAR") devices, Sonic Detection and Ranging ("SODAR") devices, anemometers, wind vanes, barometers, and radar devices (such as Doppler radar devices). Still further, any suitable measurement methods and apparatus may be utilized to directly or indirectly measure the current wind speed.

Thus, in certain embodiments, the signal paths 122 and 124 for communicating signals from the sensors 110, 80 can be broken. As such, the secondary controller 102 provides a new signal path between the wind turbine controller 26 and the sensors 110, 80. Once determined, the adjusted signals can be communicated by the secondary controller 102 to the turbine controller 26 over signal path 109. The turbine controller 26 can use the adjusted signals to control various operations of the wind turbine 10.

Referring now to FIG. 4, there is illustrated a block diagram of one embodiment of suitable components that may be included within the secondary controller 102 (or the turbine controller 26) in accordance with example aspects of the present disclosure. As shown, the secondary controller 102 may include one or more processor(s) 112 and associated memory device(s) 114 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 114 may generally be configured to store suitable computer-readable instructions that, when implemented by the processor(s) 112, configure the secondary controller 102 to perform various functions including, but not limited to, receiving directly or indirectly signals from one or more sensors (e.g. wind sensors, sensors) indicative of various input conditions, determining adjusted signals, and/or transmitting adjusted signals to a turbine controller 26, and various other suitable computer-implemented functions.

As illustrated, the memory device(s) 114 can also store a signal bias 120. The signal bias 120 can be used to offset the signal received from the safety device 104 and/or the one or more sensors 110, 80 to determine an adjusted signal. In particular implementations, a different signal bias 120 can be associated with each of a plurality of input conditions. The signal bias 120 can be programmed into the memory device(s) 114 in any suitable manner. In one example embodiment, the signal bias 120 can be automatically programmed into the memory device(s) 114 using an auto-tuning process as will be discussed in more detail below.

Additionally, the secondary controller 102 may also include a communications interface 116 to facilitate communications between the secondary controller 102 and the various components of the wind turbine 10. An interface can include one or more circuits, terminals, pins, contacts, conductors, or other components for sending and receiving control signals. Moreover, the secondary controller may include a sensor interface 118 (e.g., one or more analog-to-digital converters) to permit signals transmitted from the safety device 104 and/or the sensors 80, 110 to be converted into signals that can be understood and processed by the processors 112. Thus, in such embodiments, the secondary controller 102 may be configured to determine the signal bias 120 based at least in part on the one or more input conditions.

Referring now to FIG. 5, a flow diagram of on embodiment of a method 200 for controlling a wind turbine 10 according to the present disclosure is illustrated. The method 200 can be implemented using one or more control devices, such as one or more of the controllers depicted in FIG. 3. In addition, FIG. 5 depicts steps performed in a particular order for purposes of illustration and discussion. Those of ordinary skill in the art, using the disclosures provided herein, will understand that the steps of any of the methods disclosed herein can be modified, expanded, omitted, rearranged, and/or adapted in various ways without deviating from the scope of the present disclosure.

As shown at 202, the method 200 includes determining an existing braking procedure of the wind turbine 10 through signal manipulation, which can be a manual or automatic process. More specifically, in certain embodiments, the method 200 may include automatically determining the existing braking procedure via the secondary controller 102 using an auto-tuning process. For example, in particular embodiments, the auto-tuning process may include incrementally adjusting the signal bias 120 among a plurality of incremental signal bias values for each of a plurality of input conditions, monitoring a braking procedure of the wind turbine 10 at each of the plurality of incremental signal bias values, and selecting the signal bias 120 for the input conditions from the plurality of incremental signal bias values based at least in part on the braking procedure associated with each of the plurality of incremental signal bias values. Alternatively, the method 200 may include manually determining, via the secondary controller 102, an existing braking procedure of the wind turbine 10.

After determining the existing braking procedure of the wind turbine 10, as shown at 204, the method 200 may also include determining, via the secondary controller 102, set points for existing wind turbine sensors (e.g. sensors 110, 80) for each braking procedure. For example, in certain embodiments, the set points may be determined automatically with one or more electronic devices.

As shown at 206, the method 200 includes adding a new safety device 104 and/or reconfiguring an existing safety device 104 for a predetermined braking procedure. As shown at 208, the method 200 includes sending the output of the electronic device to existing sensors to drive the predetermined braking procedure. As shown at 210, the method 200 includes running a test for the predetermined braking procedure and SCADA feedback. If the test operates properly, the method 200 ends at 212. If the test does not operate properly, the method returns to 208 and repeats.

Referring now to FIG. 6, a schematic diagram of another embodiment of a system 150 for controlling a wind turbine according to the present disclosure is illustrated. As shown, the system 150 includes a turbine controller 26 configured to control operations of the wind turbine 10, a secondary controller 102 electronically coupled to the turbine controller 26, and at least one electronic device 152 inserted between the turbine controller 26 and the secondary controller 102. Typically, the turbine controller 26 and the secondary controller 102 are configured to communicate at least one command signal 154 therebetween. Thus, as shown, the electronic device(s) 154 is configured to intercept and adjust the command signal 154 based at least in part on a signal bias to an adjusted command signal 156 and to provide the adjusted command signal 156 to at least one of the turbine controller 26 or the secondary controller 102.

In one embodiment, as shown, the secondary controller 102 includes a converter controller of the wind turbine 10. In another embodiment, the command signal includes at least one of a torque command signal and/or any other frequency converter command signal. For example, torque control can be advantageous as having command and control both ways between the converter controller 102 and the turbine controller 26. Thus, the electronic device(s) 152 of the present disclosure take over partial control of the turbine controller 26 so as to improve annual energy production and/or reliability.

In certain embodiments, the electronic device 152 may include any suitable automatic or manual means of deciphering the command signal 154 and control system between the wind turbine controller 26 and the converter controller 102, automatic or manual means of deciphering the I/O between the turbine controller 26 and the converter controller, automatic or manual means of taking over executive control of the converter controller 102 via I/O or communication from the turbine controller 26; automatic or manual means of taking over executive control of the controller 26 via I/O or communication from the converter controller 102; data logging means to improve and automatically or manually tune the overall control of either the turbine controller 26 or converter controller 102, and/or a means to view said data over any suitable media. For example, the electrical device(s) 152 may include torque set point/demand lever, temperature feedbacks, gross power production feedbacks, generator speed feedbacks, or any other suitable electrical components. Further, by placing the electrical device(s) 152 between the turbine controller 26 and the converter controller 102, the device(s) 152 are configured to intelligently over-side signals therebetween. The signals may be analog, digital, or over a network. Thus, the electrical device(s) 152 may also have some method, manual or automatic, for deciphering the network between the turbine controller 26 and the converter controller 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling a wind turbine, comprising:
   a turbine controller configured to control operations of the wind turbine;
   a safety device configured to provide an initial signal indicative of a health status of the safety device;
   a secondary controller inserted between the safety device and the turbine controller, the secondary controller being programmed with an existing braking procedure of the wind turbine, the secondary controller configured to receive the initial signal from the safety device over a communication interface;
   wherein, if the initial signal indicates a normal health status, the secondary controller is configured to send the initial signal to the turbine controller, and
   wherein, if the initial signal indicates a poor health status, the secondary controller is configured to:
      adjust the initial signal based at least in part on a signal bias to an adjusted signal, the adjusted signal comprising an updated braking procedure for the wind turbine; and
      provide the adjusted signal to the turbine controller.

2. The system of claim 1, wherein the secondary controller is configured to adjust the initial signal without accessing computer-readable instructions implemented by the turbine controller.

3. The system of claim 1, wherein the safety device comprises at least one of an aftermarket safety device or an existing safety device of the wind turbine.

4. The system of claim 1, wherein the safety device comprises at least one of an aviation light, a vibration sensor, a loading sensor, an icing sensor, a temperature sensor, a wind condition sensor, a fire safety device, a bird or bat detector, or shadow flicker sensors.

5. The system of claim 1, wherein the existing braking procedure comprising a hard brake procedure, a medium brake procedure, and a soft brake procedure.

6. The system of claim 5, wherein the secondary controller is further configured to determine set points for existing wind turbines sensors for each of the hard brake procedure, the medium brake procedure, and the soft brake procedure.

7. The system of claim 5, wherein the existing braking procedure is automatically determined via the secondary controller using an auto-tuning process, the auto-tuning process comprising:
   for each of a plurality of input conditions, incrementally adjusting the signal bias among a plurality of incremental signal bias values;
   monitoring a braking procedure of the wind turbine at each of the plurality of incremental signal bias values, and
   selecting the signal bias for the input conditions from the plurality of incremental signal bias values based at least in part on the braking procedure associated with each of the plurality of incremental signal bias values.

8. The system of claim 5, wherein the existing braking procedure of the wind turbine is determined manually.

9. The system of claim 1, wherein the secondary controller comprises an interface configured to receive one or more input signals from a plurality of sensors, the secondary controller configured to determine the signal bias based at least in part on the one or more input signals.

10. The system of claim 9, wherein the one or more input signals comprise a signal indicative of a shaft speed, a power output, vibrations, temperature, or wind speed.

11. A method for controlling a wind turbine, the wind turbine comprising a safety device in communication with a wind turbine controller over a signal path, the method comprising:
   inserting a secondary controller between the safety device and the wind turbine controller in the signal path the secondary controller being programmed with an existing braking procedure of the wind turbine;
   generating, via the safety device, an initial signal indicative of a health status of the safety device;
   receiving, via a communication interface, the initial signal at the secondary controller;
   determining, at the secondary controller, an adjusted signal that is different from the initial signal based at least in part on a signal bias, the adjusted signal comprising an updated braking procedure for the wind turbine; and,
   providing the adjusted signal to the wind turbine controller.

12. The method of claim 11, wherein the existing braking procedure comprising a hard brake procedure, a medium brake procedure, and a soft brake procedure.

13. The method of claim 12, further comprising determining, via the secondary controller, set points for existing wind turbines sensors for each of the hard brake procedure, the medium brake procedure, and the soft brake procedure.

14. The method of claim 12, further comprising automatically determining the existing braking procedure via the secondary controller using an auto-tuning process, the auto-tuning process comprising:
   for each of a plurality of input conditions, incrementally adjusting the signal bias among a plurality of incremental signal bias values,
   monitoring a braking procedure of the wind turbine at each of the plurality of incremental signal bias values; and
   selecting the signal bias for the input conditions from the plurality of incremental signal bias values based at least in part on the braking procedure associated with each of the plurality of incremental signal bias values.

15. The method of claim 11, further comprising manually determining the existing braking procedure of the wind turbine.

* * * * *